United States Patent

[11] 3,619,454

| [72] | Inventors | Rikita Sakata<br>Yokkaichi-shi;<br>Kohei Masuda, Takashi, Masanori; Sadao Nagase, Yokkaichi-shi, all of Japan |
|---|---|---|
| [21] | Appl. No. | 771,027 |
| [22] | Filed | Oct. 28, 1968 |
| [45] | Patented | Nov. 9, 1971 |
| [73] | Assignee | Mitsubishi Petrochemical Co., Ltd.<br>Tokyo, Japan |
| [32] | Priority | Oct. 27, 1967 |
| [33] | | Japan |
| [31] | | 42/68820 |

[54] METHOD OF PREPARING POLYPROPYLENE SHEET
4 Claims, 4 Drawing Figs.

[52] U.S. Cl................................................ 264/210, 264/216, 264/237
[51] Int. Cl...................................................... B29c 25/00

[50] Field of Search.......................................... 264/216, 178–179, 180–184, 237, 348, 284, 327, 210

[56] References Cited
UNITED STATES PATENTS

| 2,936,492 | 5/1960 | Swerlick et al. .............. | 264/237 |
| 3,324,217 | 6/1967 | Armstrong et al. ........... | 264/178 |

Primary Examiner—Robert F. White
Assistant Examiner—Gene Auville
Attorney—Sughrue, Rothwell, Mion, Zinn and Macpeak ABSTRACT: Method of preparing polypropylene sheets by contacting at least one surface of a molten polypropylene sheet with a quenching roller to cool the surface of the sheet to a temperature below the melting point of the polypropylene while the inner portion of the sheet is allowed to remain in the molten state, and then contacting the sheet with quenching water maintained at a temperature lower than 40° C.

PATENTED NOV 9 1971

3,619,454

INVENTORS
RIKITA SAKATA
KOHEI MASUDA
SADAO NAGASE
MASANORI TAKASHI

BY Sughrue, Rothwell, Mion, Zinn & Macpeak
ATTORNEYS

3,619,454

METHOD OF PREPARING POLYPROPYLENE SHEET

BACKGROUND OF THE INVENTION

1. Field of the Invention

This invention relates to a method of preparing polypropylene sheets having well-finished surfaces and good biaxial stretchability. In particular, it is concerned with a method of preparing polypropylene sheets which is characterized by the manner of quenching a freshly extruded polypropylene sheet which is still in molten state.

2. Description of the Prior Art

In the extrusion of crystalline thermoplastic resins such as polypropylene in the form of sheets, the resin is usually made molten by heating it to a temperature above its melting point and continuously extruded through a die or orifice of an extrusion machine under high pressures onto a continuously moving casting surface, such as the peripheral surface of a well-ground metallic roller, or into a quenching water bath to cool and solidify it.

However, in the case of polypropylene, as is well known in the art, there is a demand for peculiar processing and fabricating techniques, due to polypropylene's peculiar melting and solidifying behavior, especially in the case where the polypropylene sheet formed by melt extrusion is to be biaxially stretched. A sheet suitable for biaxial stretching, which is usually of a thickness of at least 0.5 mm., must satisfy various conditions, such as: It must have an excellent surface smoothness, the degree of crystallization must be as low as possible and uniform throughout the whole sheet, it must be uniform in thickness and free from any creases. It is necessary in the manufacture of such polypropylene sheets to pay special attention to their dimensions, because of their relatively large thickness.

As film-forming techniques there have been known roll quenching processes and water quenching processes. Although the former process has the characteristic that it gives a film of excellent surface smoothness and uniformity in the degree of crystallization in the lateral direction, it is impossible, when the film is of a relatively large thickness, to attain sufficiently effective quenching in this process. Accordingly, the resulting film has a relatively high degree of crystallization and is non-uniform in its degree of crystallinity in the direction of its thickness, so that surface is difficulty or impossible to uniformly stretch the raw film into a stable stretched film. On the other hand, in the water quenching process, the film will be quenching effectively from both sides by the water to give a solidified polypropylene film with a low degree of crystallization. However, in the case of thick sheets, sine an extruded sheet is introduced into the water while in the molten state, the quenching is nonuniformly performed due to splashing of the boiling water onto the surface of the molten sheet and the non-uniform blowing of water against the surface of the sheet. The resulting non-uniformity in the degree of crystallization causes "haze" in the film, and the surface luster and smoothness will be spoiled by creases.

SUMMARY OF THE INVENTION

It has been found that polypropylene sheets which exhibit improved properties after having been biaxially stretched may be prepared by quenching a molten polypropylene sheet by bringing at least one surface of the sheet into contact with a quenching roller whereby the surface of the polypropylene sheet is cooled to a temperature below the melting point of polypropylene, while the interior of the sheet is allowed to remain in the molten state, and then contacting the sheet with quenching water at a temperature lower than 40°C.

In a preferred embodiment, the time of the contact of the molten polypropylene sheet with the quenching roller an be determined by utilizing the following formula:

$$210(L)^2 \log\left(\frac{0.75(t_o-t_r)}{120-t_r}\right) < \theta < 180(L-0.05)^2 \log\left(\frac{1.10(t_o-t_r)}{120-t_r}\right)+5.5$$

wherein
$\theta$ = the contact time (seconds)
L = the thickness (cm.) of the sheet
$t_o$ = the temperature (°C.) of the molten resin
$t_r$ = the surface temperature of the quenching roller.

The present invention has for its object to make it possible to obtain polypropylene sheets of good quality, especially of a thickness of 0.5 mm. or more, by solving the problems (mentioned above) which have plagued the prior art.

DESCRIPTION OF THE PREFERRED EMBODIMENTS

Figure 1:
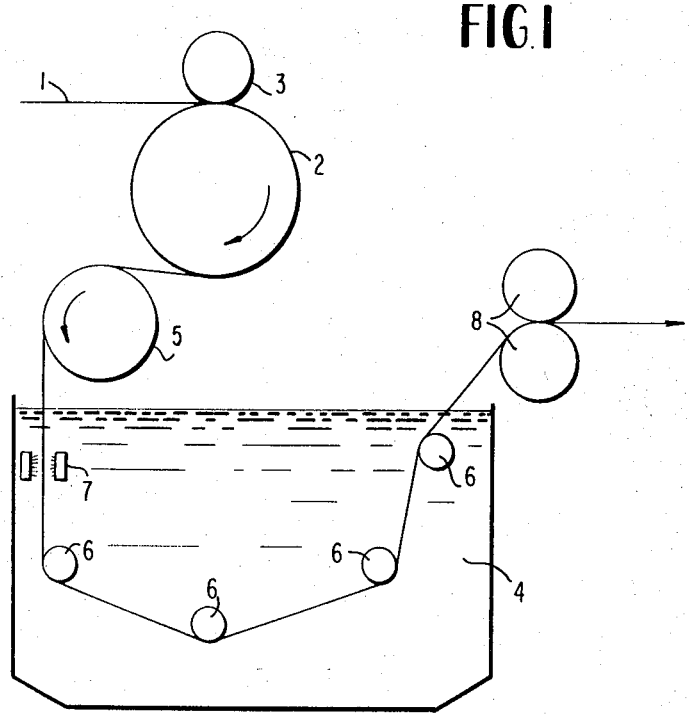
FIG. 1 is a schematic view of an apparatus which may be utilized to practice the process of the present invention.

According to the present invention, the object has been accomplished by an ingenious combination of the two prior art quenching processes discussed. That is to say, the present invention consists in the improvement in the method of preparing polypropylene sheets by quenching a molten polypropylene sheet to the solid state which comprises contacting at least one surface of the molten sheet with a quenching roll to lower the temperature of the surface to a temperature below the melting point of polypropylene while allowing the inner layer of the sheet to remain in a molten state, and then contacting the sheet with quenching water maintained at a temperature not exceeding 40° C.

The water quenching process, as mentioned above, has a very desirable feature in that the quenching of the molten sheet suffices to effectively give a polypropylene sheet of a sufficiently low degree of crystallization, but has a shortcoming in that it causes creases in the resulting sheet. We considered (based on the assumption that the creases of the sheet were attributable to the fact that the molten sheet entering into water cannot withstand the surfacial shrinking force because of its low viscosity) that to prevent creasing, it was necessary to prevent this surfacial shrinking phenomenon in order to increase the viscosity of molten polypropylene at its surface during entrance into water. This should make the surface withstand the surfacial shrinking force. By experimentation, we have now discovered that it is essential to quench at least one surface of the molten polypropylene sheet to a temperature below the crystalline melting point (usually about 165° C.), preferably below 135° C., and then to quench the film with water while the inner portion of the sheet is still in the molten state.

In the practice of the method of the present invention, it is necessary to control the temperatures of the surface and inner portion of polypropylene sheet. Although the surface temperature of the sheet an be relatively easily measured, the temperature of the inner portion is practically impossible to measure. Accordingly, the inner temperature must be estimated by calculation as shown in the examples hereinafter set forth. However, it is known that the state of temperature distribution (as in the present invention) can be realized by controlling the contact time of the sheet with the quenching roller as the first quenching means. It is known that the duration of the contact time must satisfy the following equation:

$$210(L)^2 \log\left(\frac{0.75(t_o-t_r)}{120-t_r}\right) < \theta < 180(L-0.05)^2 \log\left(\frac{1.10(t_o-t_r)}{120-t_r}\right)+5.5$$

wherein,
$\theta$ = the contact time (seconds
L = the thickness (cm.) of the sheet
$t_o$ = the temperature (°C.) of the molten resin
$t_r$ = the surface temperature of the quenching roller.

Accordingly, the object of the present invention is achieved by contacting at least one surface of the molten sheet with a quenching roll for $\theta$ seconds, and immediately thereafter contacting the sheet with quenching water.

FIG. 1 is a schematic view of an apparatus for practicing the method of the present invention.

Figure 2:
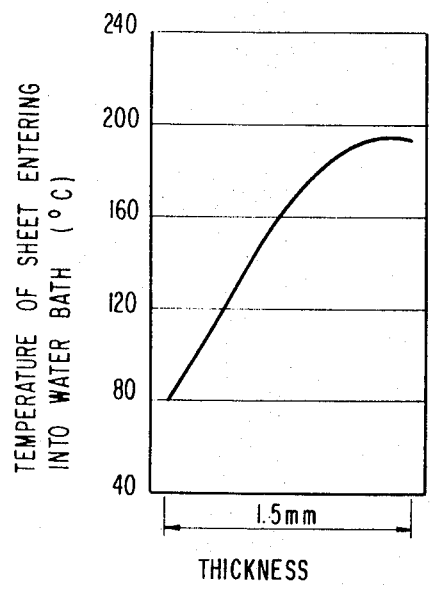
FIGS. 2–4 illustrate graphs which represent the temperature distribution over the thickness of a sheet utilized in the examples of the specification.
Figure 3:
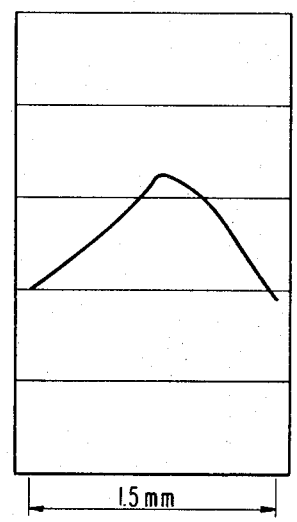
Figure 4:
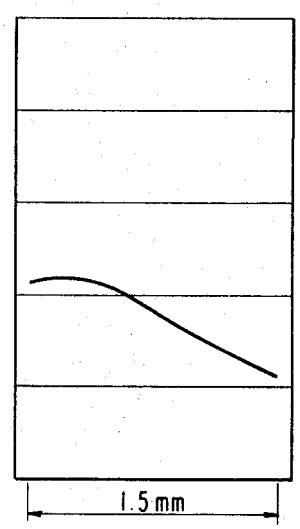

FIGS. 2 to 4 are graphs indicating the temperature distribution in the direction of thickness of the sheet in examples 1, 2 and the comparative example, respectively.

Referring to FIG. 1, the method of the present invention will now be illustrated. A polypropylene, which may be a crystalline homopolymer or copolymer of propylene or a mixture of a crystalline propylene polymer with a minor amount of another thermoplastic polymer, is made molten by heating and extruded it through a die mounted on the forward end of an extrusion machine (not shown). The molten sheet 1 thus formed was quenched, first by contact with quenching roller 2 in accordance with the present invention. It is desirable to force the molten sheet, in the vicinity of the contact point with the quenching roller, against the quenching roller by means of touch roller 3. Alternately, an air knife may be used in place of the touch roller. Although the sheet (a single surface of which has been quenched by the quenching roller) may immediately be introduced into quenching water bath 4, it is more effective to quench another surface of the sheet by means of the second quenching roller 5 prior to water quenching. In all cases, the contact time with the quenching roller is adjusted to Θ seconds, as calculated by the above equation.

In the quenching water bath, one or more guide rollers 6 are located for smooth conveying of the sheet. In order to attain good contact with the quenching water, nozzles for ejecting quenching water 7 may be employed, In all cases, the sheet is quenched from both sides thereof by quenching water while in the molecular compound, such as polypropylene, to compensate shrinkage in the longitudinal direction by carrying out the second stage quenching in the unsupported state, with respect to quenching medium. As long as this point is observed, any water quenching apparatus equivalent in function to that illustrated in the drawings may be used. The sheet then passes through the water quenching bath and is introduced through squeeze rollers 8 into the following biaxial stretching or wind-up step.

The present invention will now be illustrated in more detail by the following examples and comparative example.

The analysis of the temperature distribution in the interior of the sheet was determined by numerically calculating the following nonstatic heat transmission equation by Schmidt ("HEAT TRANSMISSION," pp. 46 by McAdams, McGraw Hill Co., 1954). The operation was made using an electronic computer MELCOM 1501, Mitsubishi Electric Mfg. Co. The Schmidt equation is as follows:

$$\frac{\partial \theta}{\partial t} = \left(\frac{K}{Pc}\right)\frac{\partial^2 \theta}{\partial x}$$

wherein Θ=time, t=temperature, x=distance, K=heat conductivity, c=specific heat, P=specific gravity. In this analysis the latent heat of crystallization was taken into consideration The constants used in this analysis were as follows:

Heat conductivity of polypropylene
$K = 3.99 \times 10^{14}$ cal./cm.$^2$sec. °C.
Film coefficient between molten resin and air
$h_a = 0.53 \, 10^{13}$ cal./cm.$^2$sec.°C.
Film coefficient of heat transmission between molten resin and roller
$h_r = 3.12 \times 10^{12}$ cal./cm.$^2$sec.°C.
Average specific heat
$c_p = 0.55$ cal./g.°C.
Average specific gravity
$P = 0.88$ g./cm.$^3$
Latent heat for crystallization
$H_c = 25.7$ cal./g.

EXAMPLE 1

An isotactic polypropylene thickness an inherent viscosity (measured at 135° C. in tetralin) of 2.8 and a n-heptane insolubility content of 98% was melted extruded at 270° C. into a sheet of a thickness of 1.5 mm. and a width of 25 cm. and quenched by means of a quenching apparatus as shown in FIG. 1 (the second quenching roll was eliminated). The apparatus comprised a pressure roller with a diameter of 70 mm., a hard chromium plated quenching roller with a diameter of 200 mm. and a water bath. The surface temperature of the quenching roller was 35° C., the temperature of the water bath was 15° C., the environmental temperature was 25° C., and the speed of withdrawal was 4 m./min. Under such conditions the proper contact time of the molten resin with the quenching roller is 3.5–7.5 seconds, the contact time in this example being 4.7 seconds.

The (7X) of the resulting sheet were as indicated in table 1. The sheet was biaxially stretched in the longitudinal direction (5X) and in the lateral direction (7X) to obtain a stretched film with a thickness of 35 microns. The biaxial stretching property of the sheet was good, and the biaxially stretched film exhibited an excellent surface luster.

Example 2

A sheet with a thickness of 1.5 mm. was extruded under the same conditions as in example 1 and quenched by means of an apparatus as shown in FIG. 1. In this case, there was employed a pressure roller of a diameter of 70 mm., a first quenching roller of a diameter of 200 mm. and a second quenching roller of a diameter of 100 mm. Both roller were hard chromium plated rollers. The surface temperature of the rollers was 40° C., the bath temperature was 15° C., the environmental temperature was 25° C. and the speed of withdrawal was 4 m./min. Under such conditions, the proper contact time between the molten resin and the quenching roller is 3.6–7.6 seconds, the contact time in this example being 7.1 seconds. The properties of the resulting sheet were as indicated in table 1. The sheet was biaxially stretched (5X) in the longitudinal direction and in the lateral direction (7X).

In this example, the stability on biaxial stretching was as good as in example 1, and the surface luster of the resulting biaxially stretched film was superior to that of the film of example 1.

A sheet was extruded under the same conditions as in example 1 and quenched by means of an apparatus as shown in FIG. 1. In this case, there was employed a pressure roller of a diameter of 70 mm., a first quenching roller of a diameter of 250 mm. and a second quenchings roller of a diameter of 200 mm. Both rollers were hard chromium plated rollers. The surface temperature of the rollers was 58° C., the bath temperature was 15° C., the environmental temperature was 20° C., and the speed of withdrawal was 4 m./min. While the proper contact time between the molten resin and quenching roller is 4.4–7.9 seconds under such conditions, the contact time utilized in this example was 9.4 seconds. The properties of the resulting sheet were as indicated in table 1. The sheet often split in the longitudinal direction upon biaxial stretching, and it was impossible to consistently produce a biaxially stretched film.

TABLE 1

| Example No. | 1 | 2 | Comparative |
|---|---|---|---|
| Irregularity in Thickness in the lateral direction (%) | 10 | 8 | 8 |
| Haze (5) | 75 | 67 | 64 |
| Luster (%) Front | 72 | 68 | 70 |
| Luster(%) Back | 25 | 45 | 43 |
| Specific gravity (g./m.$^3$) | 0.9016 | 0.9011 | 0.9040 |
| Biaxial stretching (longitudinal t X lateral 7) | good | good | often split and broken at chucks |

The analysis given above was made upon the above three examples. The temperature distribution in the thickness of the sheet entering into water bath was also determined.

The results of this determination are illustrated by FIGS. 2–4, which correspond, respectively to examples 1, 2 and the comparative example. It is clear that the figures prove that it is necessary to obtain a sheet which illustrates good biaxial stretching properties, to quench the sheet by introduction into a water bath, at least one surface of the sheet having been cooled to a temperature below the crystalline melting point while the inner portion of the sheet remains in the molten state.

What is claimed is:

1. In a method for preparing biaxially stretched polypropylene sheets which method consists of extruding a molten polypropylene sheet having a thickness greater than 0.5 mm., quenching said sheet and biaxially stretching the quenched sheet, the improvement which method consists of carrying out the quenching operation by contacting one surface of said molten polypropylene sheet with a quenching roller for a period of time as defined by the formula $$210(L)^2 \log\left(\frac{0.75(t_o - t_r)}{120 - t_r}\right) < \theta < 180(L - 0.05)^2 \log\left(\frac{1.10(t_o - t_r)}{120 - t_r}\right) + 5.5$$

wherein $\theta$ is contact time in seconds, L is the thickness in cm. of the sheet, $t_o$ is the temperature in °C. of the molten resin and $t_r$ is the surface temperature in °C. of the quenching roller, whereby said surface is cooled to a temperature below the melting point of the polypropylene while the interior of the sheet is allowed to remain in the molten state and thereafter contacting the sheet with quenching water maintained at a temperature lower than 40° C.

2. The method of claim 1 wherein said polypropylene is selected from the group consisting of homopolymers of polypropylene, copolymers of polypropylene and mixtures of a crystalline polypropylene polymer with a minor amount of another thermoplastic polymer.

3. The method of claim 1 wherein said first quenching reduces the surface of the polypropylene to a temperature below at least about 165° C.

4. A method as in claim 1 wherein said polypropylene sheet is maintained in a substantially unsupported state with respect to the quenching medium during the water quenching.

* * * * *